United States Patent
Uenosono et al.

[11] Patent Number: 5,976,215
[45] Date of Patent: Nov. 2, 1999

[54] IRON-BASED POWDER MIXTURE FOR POWDER METALLURGY AND PROCESS FOR PREPARING THE SAME

[75] Inventors: Satoshi Uenosono; Yukiko Ozaki; Kuniaki Ogura, all of Chiba; Toshio Nagase, Kawasaki; Takeo Kobayashi, Minato-Ku, all of Japan

[73] Assignee: Kawasaki Steel Corporation, Kobe, Japan

[21] Appl. No.: 09/137,105

[22] Filed: Aug. 20, 1998

[30] Foreign Application Priority Data

Aug. 29, 1997 [JP] Japan .................................. 9-234893
Oct. 28, 1997 [JP] Japan .................................. 9-295662

[51] Int. Cl.$^6$ .................................................. B22F 1/00
[52] U.S. Cl. ................................ 75/252; 75/230; 75/231; 419/36
[58] Field of Search ............................ 75/230, 231, 252; 419/36

[56] References Cited

U.S. PATENT DOCUMENTS

| | | | |
|---|---|---|---|
| 4,834,800 | 5/1989 | Semel | 106/403 |
| 5,256,185 | 10/1993 | Semel et al. | 75/255 |
| 5,298,055 | 3/1994 | Semel et al. | 75/252 |
| 5,368,630 | 11/1994 | Luk | 75/252 |
| 5,421,853 | 6/1995 | Chen et al. | 75/252 |
| 5,782,954 | 7/1998 | Luk | 75/252 |

FOREIGN PATENT DOCUMENTS

| | | |
|---|---|---|
| A-60-502158 | 12/1985 | Japan . |
| A-1-219101 | 9/1989 | Japan . |
| A-2-217403 | 8/1990 | Japan . |
| A-3-162502 | 7/1991 | Japan . |
| B2-5-27682 | 4/1993 | Japan . |
| A-5-148505 | 6/1993 | Japan . |

*Primary Examiner*—Ngoclan Mai
*Attorney, Agent, or Firm*—Oliff & Berridge, PLC

[57] ABSTRACT

An iron-based powder mixture for powder metallurgy, comprising: an iron-based powder, and from 0.05 to 0.50% by weight of a thermoplastic resin powder which comprises 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000.

10 Claims, 1 Drawing Sheet

FIG.1

IRON-BASED POWDER MIXTURE FOR POWDER METALLURGY AND PROCESS FOR PREPARING THE SAME

BACKGROUND OF THE INVENTION

1. Field of the Invention

The present invention relates to an iron-based power mixture for powder metallurgy comprising a lubricant which does not contain any metal components, and exhibiting excellent flowability and property that the mixture is smoothly discharged from a hopper.

2. Related Art

An iron-based powder mixture for powder metallurgy is in general prepared by mixing powder for alloy, such as copper powder, graphite powder or iron phosphide powder and a lubricant such as zinc stearate with iron-based powder as a base, and optionally adding powder f or improving cutting property into the resultant.

However, such a mixture has the following drawbacks.

The first drawback is that such a mixture easily segregates in terms of its particle size, its particle shape and its chemical composition. In other words, the mixture contains plural sorts of powders different in their size, shape and density, and consequently the powders are not distributed uniformly in the mixture when the mixture is transported, put into a hopper or taken out from it after the mixing, or the mixture is charged into a mold and then subjected to press-molding process. Thus, the aforementioned segregation is caused.

As regards, for example, the mixture of iron powder and graphite powder, in transportation by truck, the iron powder and the graphite powder are freely moved and shifted in a transporting container by vibration, so that they will not be distributed uniformly. Thus, segregation is caused. It is especially well-known that the graphite powder having a small density rises to the surface of the mixture. As is also well known, in the mixture put into a hopper, segregation is caused by movement thereof in the hopper, and thus the concentration of the graphite powder in the mixture discharged from the hopper varies among the early stage, the middle stage and the late stage of the discharging.

When the mixture wherein the segregation is caused is press (compression)-molded and then the resultant molded bodies are sintered to prepare sintered bodies as final products, the composition, size and strength of the sintered bodies vary among the respective products. Thus, inferior products are prepared. All of the mixed copper powder, graphite powder and iron phosphide powder have a small particle size than that of iron powder; therefore, the specific area of the mixture is increased so that its flowability drops. The drop in the flowability of the mixture results in the drop in the speed of charging the mixture into a mold. As a result, the productivity of molded bodies, which may be called green compacts as the case may be, is lowered.

To prevent segregation of such a mixture, Japanese Patent Publication (JP-B) No. 5-27682 discloses an improved powder composition comprising an iron based powder, at least one powder for alloy, and a binder for the iron-based powder and the powder for alloy, and prepared by mechanically mixing the binder with the iron-based powder and the powder for alloy, characterized in that the binder is methacrylic polymer which is substantially water-insoluble and the binder is contained in an amount of about 0.005–1.0% by weight. The column of "Detailed explanation of the inventions" in this publication discloses a homopolymer of methylmethacrylate (poly(methylmethacrylate)) as a methacrylic polymer. However, this mixture disclosed in JP-B-No. 5-27682 contains methyl polymethacrylate as the binder for bonding the powder for alloy to the iron-based powder but not as powder. Methyl polymethacrylate as the binder naturally causes segregation to be prevented, but property of causing the mixture to be smoothly discharged from any hopper, which will be referred to as the hopper discharging property hereinafter, is insufficient. Thus, it needs to be improved. There also remains another problem that the resin as the binder is dissolved in an organic solvent and then the resultant is applied to the surface of the iron-based powder thinly so that the cost for collecting the organic solvent will be raised.

As another segregation preventing technique, Japanese Patent Application Laid-Open (JP-A) No. 1-219101 discloses a mixture powder wherein graphite powder is bonded to the surface of iron-based powder with zinc stearate as a binder. Furthermore, the present inventors proposed a method wherein a metallic soap and a fatty acid are used as a binder in JP-A-No. 3-162502. However, the mixtures disclosed in these publications contain compounds containing zinc or other metal elements as the binder. Thus, the metal elements in the binder are turned into oxides during sintering a molded body, so that the oxides will cause contamination inside a sintering furnace and change in the chemical composition of the sintered body.

To overcome these problems, mixtures wherein a binder containing no metal element is used are proposed in JP-A-No. 60-502158 and JP-A-2-217403. In the techniques described in these publications, however, zinc stearate is finally added as a lubricant since the binder itself does not have any lubricating effect. Thus, the problem about the aforementioned hopper discharging property is not overcome.

In the light of these problems, the present inventors disclosed a solution for these problems in JP-A-No. 5-148505, that is, an iron-based mixture for powder metallurgy prepared by mixing a powder for alloy and an iron-based powder with at least one binder selected from the group consisting of stearatic acid, oleamide, stearamide, a melted mixture of stearamide and ethylenebis(stearamide), and ethylenebis(stearamide), heating and subsequent cooling the resultant so that the powder for alloy and the like are bonded to the iron-based powder with the hardened binder, and adding into this the same sort of powder as the binder and a powder such as zinc stearate, as a lubricant, and mixing the resultant; and a method for preparing this mixture. The inventors proposed that lithium stearate should be used as the lubricant in the case of using hot-melted zinc stearate, higher fatty acid, amide of higher fatty acid, or wax, as the binder.

Even by this technique, however, the contamination inside the sintering surface cannot be completely eliminated since the mixture still contains a metallic soap such as zinc stearate or lithium stearate in a small amount. In the case of using a lubricant containing no metallic soap such as zinc stearate or lithium stearate, that is, a lubricant consisting of only organic substances without any metal component being contained, the flowability and the hopper discharging property of the obtained iron-based powder mixture are deteriorated.

SUMMARY OF THE INVENTION

Therefore, an object of the present invention is to provide an iron-based powder mixture comprising a lubricant which does not contain any metal components causing the contamination inside the sintering furnace, and exhibiting excellent flowability and hopper discharging property.

To attain this object, the inventors have investigated conventional iron-based powder mixtures for powder metallurgy and then obtained many new findings which will be described later. The inventors have made sure that even if a lubricant which is made of only organic substances and contains no metal components is used, it is possible to obtain a powder keeping properties of the powder and green compacts as high as those in the prior art and exhibiting excellent flowability and hopper discharging property, and then have completed the invention.

Thus, the first aspect of the invention is an iron-based powder mixture for powder metallurgy, comprising:
   an iron-based powder, and
   from 0.05 to 0.50% by weight of a thermoplastic resin powder which comprises 50% or more by weight of units of at least one monomer unit selected from the group consisting of acrylic esters, methacrylic esters, and aromatic vinyl compounds, and whose average primary particle size is from 0.03 to 5 $\mu$m, whose average agglomeration particle size is from 5 to 50 $\mu$m, and whose average molecular weight measured by the specific viscosity of a solution is from 30000 to 5000000.

The second aspect of the invention is an iron-based powder mixture for powder metallurgy, comprising:
   an iron-based powder,
   from 0.1 to 1.0% by weight of at least one lubricant bonded to the iron-based powder, and selected from the group consisting of stearic acid, oleamide, stearamide, a melted mixture of stearamide and ethylenebis(stearamide), and ethylenebis(stearamide),
   a powder for alloy and/or a powder for improving cutting property, bonded to the iron-based powder with the lubricant, and
   from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 $\mu$m, whose average agglomeration particle size is from 5 to 50 $\mu$m, and whose average molecular weight measured by the specific viscosity of a solution is from 30000 to 5000000.

According to a preferred embodiment, the aforementioned iron-based powder mixture for powder metallurgy further comprises 0.5% or less by weight of at least one lubricant powder selected from the group consisting of stearic acid, oleamide, stearamide, a melted mixture of stearamide and ethylenebis(stearamide), ethylenebis(stearamide), polyethylene having a molecular weight of 10000 or less, and a melted mixture of ethylenebis(stearamide) and polyethylene having a molecular weight of 10000 or less.

According to a preferred embodiment, the aforementioned further comprises from 0.01 to 0.3% by weight of at least one organic liquid lubricant selected from the group consisting of oleic acid, spindle oil and turbine oil.

The third aspect of the invention is an iron-based powder mixture for powder metallurgy, comprising:
   an-iron-based powder,
   a powder for alloy and/or a powder for improving cutting property,
   from 0.1 to 1.0% by weight of at least one lubricant powder selected from the group consisting of stearic acid, oleamide, stearamide, a melted mixture of stearamide and ethylenebis(stearamide), ethylenebis(stearamide), polyethylene having a molecular weight of 10000 or less, and a melted mixture of ethylenebis(stearamide) and polyethylene having a molecular weight of 10000 or less,
   from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 $\mu$m, whose average agglomeration particle size is from 5 to 50 $\mu$m, and whose average molecular weight measured by the specific viscosity of a solution is from 30000 to 5000000.

According to a preferred embodiment, in the aforementioned iron-based powder mixture for powder metallurgy, the thermoplastic resin powder is poly(methylmethacrylate).

The fourth aspect of the invention is a process for preparing an iron-based powder mixture for powder metallurgy, comprising the steps of:
   mixing an iron-based powder, a powder for alloy and/or a powder for improving cutting property, and from 0.1 to 1.0% by weight of at least one lubricant selected from the group consisting of stearic acid, oleamide, stearamide, a melted mixture of stearamide and ethylenebis(stearamide), and ethylenebis(stearamide),
   heating and mixing the mixture, when at least one of lubricant is melted, in the case wherein the lubricant of a single sort is used, at not less than 10—not less than 100° C. temperature than the melting point of the lubricant, and, in the case wherein the lubricants of 2 or more sorts are used, at a temperature within the range from not less than 10° C. higher temperature than the lowest melting point of the lubricants to the highest melting point of the lubricants,
   cooling the mixture, thereby bonding the powder for alloy and/or the powder for improving cutting property to the iron-based powder with the lubricant, and
   mixing the mixture after the bonding treatment with from 0.05 to 0.50% by weight of units of a thermoplastic resin powder which contains 50% or more by weight of at least one monomer selected from the group consisting of acrylic esters, methacrylic esters, and aromatic vinyl compounds, and whose average primary particle size is from 0.03 to 5 $\mu$m, whose average agglomeration particle size is from 5 to 50 $\mu$m, and whose average molecular weight measured by the specific viscosity of a solution is from 30000 to 5000000.

The fifth aspect of the invention is a process for preparing an iron-based powder mixture for powder metallurgy, comprising the steps of:
   mixing an iron-based powder, a powder for alloy and/or a powder for improving cutting property, from 0.1 to 1.0% by weight of at least one lubricant selected from the group consisting of stearic acid, oleamide, stearamide, a melted mixture of stearamide and ethylenebis(stearamide) and ethylenebis(stearamide), and from 0.01 to 0.3% by weight of at least one organic liquid lubricant selected from the group consisting of oleic acid, spindle oil and turbine oil,
   heating and mixing the mixture, when at least one of lubricants is melted, in the case wherein the lubricant of a single sort is used, at not less than 10—not less than 100° C. temperature than the melting point of the lubricant, and, in the case wherein the lubricants of 2 or more sorts are used, at a temperature within the range from not less than 10° C. higher temperature than the lowest melting point of the lubricants to the highest melting point of the lubricants, cooling the mixture, thereby bonding the powder for alloy and/or the powder for improving cutting property to the iron-based powder with the lubricant, and mixing the mixture after the bonding treatment with from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000.

According to a preferred embodiment, from 0.5% or less of at least one selected from the group of the following lubricant powders is added to the mixture after the bonding treatment:

stearic acid, oleamide, stearamide, a melted mixture of stearamide and ethylenebis(stearamide), ethylenebis(stearamide), polyethylene having a molecular weight of 10000 or less, and a melted mixture of ethylenebis(stearamide) and polyethylene having a molecular weight of 10000 or less.

According to a preferred embodiment, in the aforementioned process for preparing an iron-based powder mixture for powder metallurgy, the thermoplastic resin powder is poly(methylmethacrylate).

DESCRIPTION OF PREFERRED
EMBODIMENTS OF THE INVENTION

Preferred embodiments of the present invention will be in detail described below.

The important point of the iron-based powder mixture for powder metallurgy according to the present invention, which may be referred to as the mixture according to the invention hereinafter, is that the iron-based powder is mixed with from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000. The resin powder has never been used as disengaged powder (i.e., powder as a non-binder) for powder metallurgy. This results in improvement in the flowability and the hopper discharging property of the mixture according to the invention, as compared with mixtures in the prior art.

Preferably, the iron-based powder may be a reduced iron powder obtained by reducing iron ore or mill scale generated in preparing steels, or a pure iron powder and/or an alloy iron powder prepared by atomizing melted steel. The powder for alloy added thereto may be a graphite powder, a copper powder, various alloy powders. The powder for improving cutting property of the sintered body may be talc, metal sulfide or the like, and is selected in the light of properties required in the sintered product. The total amount of the powder(s) for alloy is preferably 5.0% or less by weight, and the total amount of the powder(s) for improving the cutting property is preferably 5.0% or less by weight. The reason why the amount of the added thermoplastic resin powder containing 50% or more by weight of units of at least one monomer selected from the group consisting of the above-specified acrylic esters, methacrylic esters and aromatic vinyl compounds is set within the range from 0.05% to 0.50% by weight is as follows. If this amount is less than 0.05 by weight, the hopper discharging property is decreased. On the contrary, if this amount is more than 0.5% by weight, compressibility drops.

Figure 1:
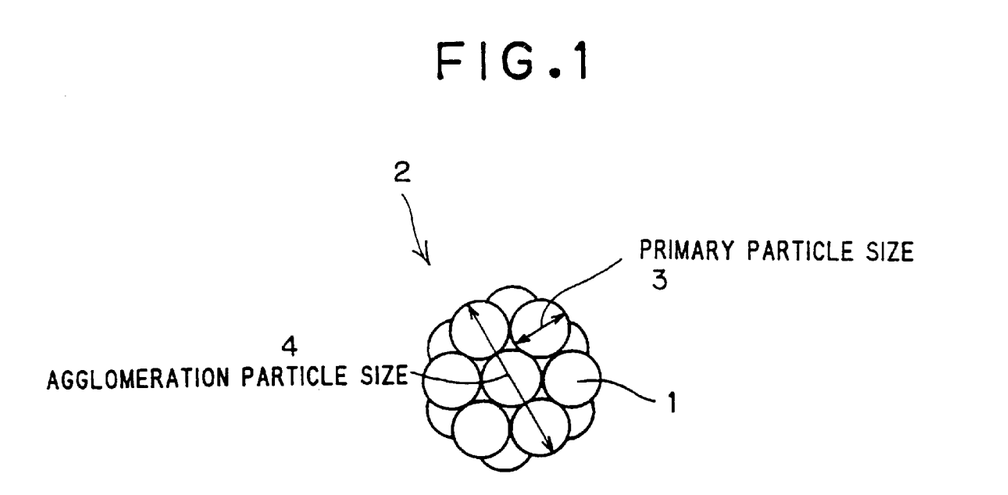
FIG. 1 shows an agglomeration of a thermoplastic resin powder.

As shown in FIG. 1, the average primary particle size is an average value of the plural particles (i.e., the primary particles 1) of the thermoplastic resin, and is not an average value of agglomerations 2 generated by agglomerating the primary particles. Specifically, it is obtained by observing the agglomeration 2 through an electron microscope, taking an SEM photograph thereof, measuring the particle sizes (the primary particle sizes 3) of about 50 primary particles 1 constituting the agglomeration 2, and averaging them. The average particle size of the agglomerations 2 can be also determined from the result (the SEM photograph) of the observation of the agglomeration size 4 through the electron microscope. The reasons for restricting these particle sizes within the aforementioned ranges will be described later.

The thermoplastic resin powder preferably contains 50% or more by weight of units of at least one monomer selected from the group consisting of acrylic esters, methacrylic esters, and aromatic vinyl compounds. If the monomer unit content is less than 50% by weight, it is feared that the thermoplastic resin powder does not cause sufficient improvement in the flowability of the mixture in the case wherein the resin powder is used as a lubricant for the iron-based powder. The monomer may be used alone or in combination of two or more sorts.

The acrylic esters as the monomer unit of the thermoplastic resin powder include, for example, methyl methacrylate, ethyl acrylate, n-propyl acrylate, isopropyl acrylate, n-butyl acrylate, isobutyl acrylate, sec-butyl acrylate, t-butyl acrylate, n-hexyl acrylate, cyclohexyl acrylate, 2-ethylhexyl acrylate, and n-octyl acrylate.

The methacrylic esters include, for example, methyl methacrylate, ethyl methacrylate, n-propyl methacrylate, isopropyl methacrylate, n-butyl methacrylate, isobutyl methacrylate, n-hexyl methacrylate, cyclohexyl methacrylate, 2-ethylhexylmethacrylate, and n-octyl methacrylate. Among these monomers, methyl methacrylate is especially preferable.

The aromatic vinyl compounds include, for example, styrene, α-methylstyrene, divinylbenzene; or any monomer wherein a benzene nucleus in there monomers has a substituent group such as a methyl, ethyl, propyl or butyl group, for example, vinyl toluene or isopropyl styrene.

Other monomers which may be copolymerized with the aforementioned three sorts of monomer units include, for example, unsaturated monocarboxylic acids such as acrylic acid, methacrylic acid, 2-ethylacrylic acid, crotonic acid, or cinnamic acid; unsaturated dicarboxylic acids or anhydrides thereof such as maleic acid, itaconic acid, fumaric acid, citraconic acid, chloromaleic acid; esters of unsaturated dicarboxylic acids or derivatives thereof such as monomethyl maleate, monobutyl maleate, monomethyl fumarate, monoethyl fumarate, monomethyl itaconate, monoethyl itaconate and monobutyl itaconate; glycidyl ethers such as glycidylmethacrylate, glycidylacrylate, glycidyl-p-vinylbenzoate, methylglycidylitaconate, ethylglycidylmaleate, and glycidylvinylsulphonate; epoxide olefines such as butadiene monooxide, vinylcyclohexene monooxide, 5,6-epoxyhexene, and 2-methyl-5,6-epoxyhexene; vinyl cyanides such as acrylonitryl and methacrylonitryl; vinyl esters such as vinyl acetate, vinyl propionate, vinyl myristate, vinyl oleate and vinyl benzoate; and conjugated diene compounds such as butadiene, isoprene, 1,3-pentadiene and cyclopentadiene; non-conjugated diene compounds such as 1,4-hexadiene, dicyclopentadiene and ethylidenenorbornene. As the monomer which can be copolymerized, a crosslinking monomer having 2 or more double bonds having substantially the same reactivity may be added in an amount of 0.1–2% by weight of the total monomers, which is preferable. The crosslinking monomer includes, for example, ethyleneglycol diacrylate, ethyleneglycol dimethacrylate, butyleneglycol diacrylate, butyleneglycol dimethacrylate, trimethylolpropane diacrylate, trimethylolpropane dimethacrylate, trimethylolpropane triacrylate, trimethylolpropane trimethacrylate, hexanediol diacrylate, hexanediol dimethacrylate, oligoxyethylene diacrylate, oligoxyethylenedimethacrylate, aromatic divinyl mononers such as divinylbenzene, triallyl trimellitate, triallyl isocyanurate.

In the invention, the average primary particle size (on the basis of the weight of the particles) of the thermoplastic resin powder is limited to 0.03–5.0 μm. If the average primary particle size is less than 0.03 μm, the cost for preparing the mixture according to the invention is raised so that it is not suitable for industrial products. If the average primary particle size is more than 5.0 μm, green density when the mixture is charged into a mold and compressed, which will be referred to as the compressibility hereinafter, is lowered. However, the average primary particle size is more preferably from 0.05 to 3.0 μm for practical use. The average agglomeration particle size of the resin powder is limited to the range from 5 to 50 μm. If the average agglomeration particle size is less than 5 μm, the flowability and the hopper discharging property of the mixture according to the invention are lowered. If the average agglomeration particle size is more than 50 μm, the tensile strength of a sintered body obtained by sintering a green compact made of the mixture, which will be referred to as the sintered body hereinafter, is lowered, as compared with sintered bodies obtained from mixtures in the prior art. The average agglomeration particle size is more preferably from 10 to 40 μm. As the thermoplastic resin powder, the combination of 2 or more sorts of thermoplastic resin powders having different average particle sizes may be mixed. In this case, the mixing ratio is adjusted in such a manner that the average primary particle size on the basis of the total weight of the mixed powders will be from 0.03 to 5.0 μm.

Furthermore, in the invention the average molecular weight of the thermoplastic resin powder, measured by the specific viscosity of solution, is limited to the range from 30000 to 5000000. If the average molecular weight is less than 30000, the cost for preparing the mixture according to the invention is raised so that it is not suitable for industrial products. If the average molecular weight is more than 5000000, the flowability and the hopper discharging property of the mixture are-lowered, as compared mixtures in the prior art. The specific viscosity of a solution herein is a method of dissolving a sample resin into 50 ml tetrahydrofuran, obtaining the ratio of the viscosity of the solution at 35° C. to that of this solvent at 35° C., and then obtaining the average molecular weight of the sample resin from the relationship between specific viscosity and average molecular weight which is beforehand determined on the basis of various polystyrene reference solutions having known average molecular weights.

The process for preparing the thermoplastic resin is not limited. The process includes, for example, any process for preparing a fine resin powder such as polymethyl methacrylate powder in the prior art, specifically, micro-suspension polymerization, emulsion polymerization, seeding emulsion polymerization or the like. Among these processes, preferred is any process wherein spherical particles whose particle sizes are not very fine can be obtained.

As the micro-suspension polymerization, preferred is a process of using an oil-soluble initiator as a radical polymerization initiator, adjusting the size of oil drops of monomers before polymerization into uniformity, and then dispersing/polymerizing the monomers uniformly.

The oil-soluble radical polymerization initiator includes, for example, benzoyl peroxide, diacyl peroxide such as di-3,5,5-trimethylhexanoyl peroxide, dilauroyl peroxide, peroxydicarbonate such as diisopropylperoxy dicarbonate, di-sec-butylperoxydicarbonate, di-2-ethylhexylperoxydicaroboante, peroxyester such as t-butylperoxipyvalate, t-butylperoxyneodecanoate, organic peroxides such as acetylcyclohexylsulphonyl peroxide, disuccinic acid peroxide, azo compounds such as 2, 2'-azobisisobutylonitrile, 2, 2'-azobis-2-methylbutylonitrile, 2, 2'-azobisdimethylvarelonitrile. The radical polymerization initiator may be used alone or in combination of two or more sorts. The amount thereof may be selected dependently on the sort of the monomers and a way of introducing it, but it is in general preferred that the amount is from 0.001 to 5.0 parts by weight per 100 parts of the used monomer.

When the micro-suspension polymerization is carried out, a surfactant or a dispersant is usually used. The surfactant includes, for example, alkyl sulfates such as sodium lauryl sulfate, sodium myristyl sulfate; alkylaryl sulphonate such as sodium dodecylbenzene sulphonate, pottasium dodecylbenzene sulphonate; sulphosuccinate such as sodium dioctylsulphosuccinate, sodium dihexylsulphosuccinate; salts of fatty acides such as ammonium laurate and pottasium stearate; polyoxyethylenealkylsulphate; polyoxyethylenealkylarylsulphate; anionic surfactants such as sodium dodecyldiphenyletherdisulphonate; sorbitan esters such as sorbitanmonooeate, polyoxyethylenesorbitanmonostearate; polyoxyethylenealkylether; nonionic surfactants such as polyoxyethylenealkylphenylether; cationic surfactans such as cetylpyridinium chloride, cetyltrimethylammonium bromide. The dispersant includes, for example, polyvinylalcohol, methylcellulose, and polyvinylpyrrolidone. The surfactant or the dispersant may be used alone or in combination of two or more sorts. The amount thereof may be selected within the range from 0.05 to 5 parts by weight, and preferably from 0.2 to 4 parts by weight per 100 parts of the used monomer.

The micro-suspension polymerization comprises the steps of adding, into an aqueous medium, the oil-soluble initiator, the monomer, the surfactant, and optional additives, for example, an polymerization aiding agent such as a higher fatty acid or higher alcohol; mixing it in advance; and homogenizing it with a homogenizer to adjust the size of the oil droplets. The homogenizer which may be used is, for example, a colloid mill, a vibration stirrer, a 2-stage high pressure pump. High pressure-jetting from a nozzle or an orifice, or ultrasonic stirring may be also used. The adjustment of the size of the oil droplets is influenced by control of shearing force in the homogenizing treatment, stirring condition in the polymerization, a type of the reacting device, the amounts of the surfactant and the additive, and the like, but for them appropriate conditions can be selected in simple preparatory experiments. The homogenized solution containing the whole of the monomers is carried to a polymerizing vessel, heated with stirring, and then polymerized at a temperature, in general, from 30 to 80° C.

As a result, it is possible to obtain emulsion solution or suspension solution wherein the thermoplastic powder having an average primary particle size from 0.03 to 5.0 $\mu$m is uniformly dispersed. The emulsion solution or suspension solution is spray-dried. Alternatively, the thermoplastic resin particles are agglomerated, filtered to separate liquid, dried and pulverized. Thus, a thermoplastic resin powder can be obtained. The weight-average molecular weight of the thermoplastic resin can be adjusted to a desired value by control of reacting temperature or adding a polymerization-adjusting agent.

The present invention provides not only the aforementioned mixture but also a mixture having effect of preventing segregation of the powder for alloy and the powder for improving the cutting property. This mixture is a mixture comprising an iron-based powder, from 0.1 to 1.0% by weight of at least one lubricant bonded to the iron-based powder, and selected from the group consisting of stearic acid, oleamide, stearamide, a melted mixture of stearamide and ethylenebis(stearamide), and ethylenebis(stearamide), a powder for alloy and/or a powder for improving cutting property, bonded to the iron-based powder with the lubricant, and from 0.05 to 0.50% by weight of a thermoplastic resin powder which contains 50% or more by weight of units of at least one monomer selected from the group consisting of the acrylic esters, the methacrylic esters, and the aromatic vinyl compounds. This mixture may optionally comprise a disengaged powder containing 0.5% or less by weight of at least one lubricant powder selected from the group consisting of stearic acid, oleamide, stearamide, a melted mixture of stearamide and ethylenebis(stearamide), ethylenebis(stearamide), polyethylene having a molecular weight of 10000 or less, and a melted mixture of ethylenebis (stearamide) and polyethylene having a molecular weight of 10000 or less. This mixture makes it possible not only to prevent segregation of the powder for alloy and the like in the mixture without metallic soaps such as zinc stearate being used as a lubricant, but also to keep properties of the powder and green compact as high as those in the prior art and exhibit the flowability and the hopper discharging property. The reason for preventing segregation is that the mixed; heated and cooled lubricant exhibits bonding effect so that it causes the powder for alloy and/or the powder for improving the cutting property to be bonded to the surface of the iron-based powder.

According to the invention, it is possible to provide an iron-based mixture, which will be referred to a simple mixture powder as the case may be, which keeps properties of the powder and green compact as high as those in the prior art and exhibits the flowability and the hopper discharging property by simply mixing an iron-based powder, a powder for alloy and/or a powder for improving cutting property, a disengaging powder of from 0.1 to 1.0% by weight of at least one lubricant selected from the same group as above, and a disengaged powder of from 0.05 to 0.50% by weight of a thermoplastic resin powder which contains 50% or more by weight of units of at least one monomer selected from the group consisting of the above-specified acrylic esters, methacrylic esters, and aromatic vinyl compounds, without the lubricant exhibiting the bonding effect being used.

The mixture according to the invention can be prepared by carrying out the following steps in sequence.

(1) The step of mixing an iron-based powder, a powder for alloy and/or a powder for improving cutting property, and from 0.1 to 1.0% by weight of at least one lubricant selected from the group consisting of stearic acid, oleamide, stearamide, and a melted mixture of stearamide and ethylenebis (stearamide) and ethylenebis(stearamide);

(2) the step of heating and mixing the mixture, in the case wherein the lubricant of a single sort is used, at not less than 10—not less than 100° C. temperature than the melting point of the lubricant, and, in the case wherein the lubricants of 2 or more sorts are used, at a temperature within the range from not less than 10° C. higher temperature than the lowest melting point of the lubricants to the highest melting point of the lubricants in order that at least one of lubricants is melted;

(3) the step of cooling the mixture, thereby bonding the powder for alloy and/or the powder for improving cutting property to the iron-based powder with the lubricant, and (4) the step of mixing the mixture after the bonding treatment with from 0.05 to 0.50% by weight of a thermoplastic resin powder which contains 50% or more by weight of units of at least one monomer selected from the group consisting of the above-specified acrylic esters, methacrylic esters, and aromatic vinyl compounds, at a temperature of the lowest melting point of the organic lubricant, or less, and preferably room temperature, and (5) the optional step of mixing from 0.5% or less of at least one selected from the group of consisting of the following lubricant powders:

stearic acid (melting point: 69° C.), oleamide (melting point: 76° C.), stearamide (melting point: 103° C.), a melted mixture of stearamide and ethylenebis(stearamide) (melting point: 125° C.), ethylenebis(stearamide) (melting point: 147° C.), polyethylene having a molecular weight of 10000 or less (melting point: 110–150° C.), and a melted mixture of ethylenebis(stearamide) and polyethylene having a molecular weight of 10000 or less (melting point: 130–140° C.).

The reason for using the aforementioned lubricant is that in the same manner as zinc stearate (melting point: 120° C.) containing a metal element used in the prior art, the lubricant is melted or softened by friction heat when the iron-based powder mixture is press-molded in a molding, so that the lubricant can exhibit the original function of the lubricant itself. This mixing with heat-melting lubricant causes improvement in bonding degree of the powder for alloy and/or the powder for improving the cutting property to the iron-based powder. If the amount of the heat-melted lubricant exhibiting the bonding effect is less than 0.1% by weight, the amount of the powder for alloy and the like bonded to the surface of the iron-based powder is decreased so that its segregation in the mixture will be increased. If the amount of the heat-melted lubricant exhibiting the bonding effect is more than 1.0% by weight, the hopper discharging property cannot be improved.

The reason for adding at least one powder selected from the group consisting of the same lubricants as above in an amount of 0.5% or less by weight at ordinary temperate in the step (5) is that, as described above, such addition causes the lubricant to be melted or softened by friction heat when the iron-based powder mixture is press-molded in a molding, and consequently causes the lubricant to exhibit the original function of the lubricant. If the powder is added in an amount of more than 0.5% by weight, the mixture cannot be discharged smoothly.

At least one organic liquid lubricant selected from oleic acid, spindle oil and turbine oil may be added in an amount from 0.01 to 0.3% by weight, together with the aforementioned lubricant, into the mixture according to the invention, thereby strengthening bonding of the powder for alloy and the like to the iron-based powder and stabilizing the apparent density of the mixture itself. If the added amount is less than 0.01% by weight, the apparent density cannot be stabilized. If the added amount is more than 0.3% by weight, the hopper discharging property is deteriorated. It is preferred that the timing of adding the liquid lubricant is before mixing the iron-based powder (iron powder) with the other powders (alloy powder and the like). This reason is that the surface of the iron powder is rapidly covered with the liquid lubricant when the iron powder is mixed with the other powders so as to prevent deformation of the iron powder resulting from surface abrasion and collision of the iron particles caused by stirring, thereby restraining the drop in the hopper discharging property caused by the deformation, and further that the liquid lubricant has the function of making bonding of the additives to the surface of the iron powder easy. In the case of adding the liquid lubricant during the mixing, the effect of stabilizing the apparent density is weak, and the hopper discharging property is also decreased. In the case of adding the liquid lubricant after the mixing, the effect of stabilizing the apparent density and the hopper discharging property are decreased. In the case of using the liquid lubricant, the amount of the added organic lubricant exhibiting the bonding effect by the mixing with heat-melting is the same as in the case of using no liquid lubricant.

In the case wherein the used lubricant (except the liquid lubricant) is a single sort in the invention, the aforementioned heating temperature is 10–100° C. higher temperature than the melting point of the lubricant, and, in the case wherein the used lubricants are 2 or more sorts, the heating temperature is a temperature within the range from not less than 10° C. higher temperature than the lowest melting point of the lubricants to the highest melting point of the lubricants, in order that at least one of thus lubricants should be melted. In the case of using lubricant of a single sort, the bonding effect can be exhibited by heating the mixture at a temperature of not less than [its melting point+10° C.], while the decrease in the bonding effect caused by thermal decomposition can be prevented by heating the mixture at a temperature of not more than [its melting point+100° C.]. In the case of using the lubricants of two or more sorts, the bonding effect can be exhibited by heating the mixture at a temperature of not less than [the lowest melting point thereof+10° C.], while the decrease in the bonding effect caused by thermal decomposition can be prevented and the hopper discharging property can be improved by heating the mixture at a temperature of not more than the highest melting point thereof.

In the process for preparing the simple mixture powder, from 0.1 to 1.0% by weight of at least one selected from stearic acid, oleamide, stearamide, a melted mixture of stearamide and ethylenebis(stearamide), ethylenebis (stearamide), polyethylene powder having a molecular weight of 10000 or less, and a melted mixture of ethylenebis (stearamide) and polyethylene having a molecular weight of 10000 or less, and from 0.05 to 0.50% by weight of a thermoplastic resin powder containing 50% or more by weight of units of at least one monomer selected from the group consisting of the above-specified acrylic esters, methacrylic esters and aromatic vinyl compounds are simply added, as a lubricant for disengaged powder, into an iron-based powder, a powder for alloy and a powder for improving cutting property, and the like, and then mixed. By only this step, it is possible to keep properties of the powder and green compact as high as those in the prior art and exhibit the excellent flowability and the hopper discharging property. The reason why the amount of one or more selected from the aforementioned group of the lubricant is set within the range from 0.1 to 1.0% by weight is as follows. If the amount is less than 0.1% by weight, the pulling-out power for pulling out a molded body from the mold, which will be referred to as ejection force hereinafter, becomes too large. On the contrary, if the amount is more than 1.0% by weight the flowability is decreased. The reason why the amount of the added thermoplastic resin powder containing 50% or more by weight of units of at least one monomer selected from the group consisting of the above-specified acrylic esters, methacrylic esters and aromatic vinyl compounds is set within the range from 0.05 to 0.50% by weight is as follows. If this amount is less than 0.05% by weight, the hopper discharging property is decreased. On the contrary, if this amount is more than 0.5% by weight, compressibility drops. The reasons why about the shape of fine particles of thermoplastic resin powder the average primary particle size is set within the range from 0.03 to 5 $\mu$m and the average agglomeration size is set within the range from 5 to 50 $\mu$m are the same reasons as above.

For mixing, it is preferred to use a V-typed blender or a W-typed cone mixer.

EXAMPLES

Sorts of thermoplastic resin powders used in Examples of the invention, the compositions thereof, and processes for polymerizing them are shown in Table 1. Examples for A group related to mixtures for which prevention of segregation is regarded as important and Examples for B group related to the simple mixtures were separately carried out.

Table 1

A Group

To prepare each of powder mixtures for powder metallurgy according to the invention, the following were sufficiently mixed with an iron powder (iron-based powder) having an average particle size of 78 $\mu$m in a heating mixer: 1% by weight of a graphite powder (powder for alloy) having an average particle size of 23 $\mu$m, 2% by weight of an electrolytic copper powder (powder for alloy) having an average particle size of 25 $\mu$m, and primary-mixed lubricant (s) (organic lubricant and liquid lubricant) shown in Table 2. The mixture continued to be mixed while they were heated at a not less than 10° C. temperature than the lowest melting point of the organic lubricant(s) to the highest melting point thereof (The process up to this step is referred to as primary mixing). Subsequently, the mixture was cooled to 85° C. or less with being mixed, and then was further cooled to 40° C. After that, added thereto were secondary-mixed lubricants shown in Table 3, that is, lubricants (B) and/or a thermoplastic resin powder, as disengaged powder, and then they were mixed to become uniform (this process is referred to as secondary mixing), and discharged from the heating mixer.

Table 2

Table 3

On the contrary, in order to perform comparison with properties-of the mixtures according to the invention thus prepared, the compositions of the lubricant(s) and preparing conditions were changed as shown in Tables 5 and 6 but the same powders were used to prepare mixtures (Comparative Examples) separately.

Table 5

Table 6

In all of the Tables described in the specification, Examples related to A group according to the invention are represented by A Ex. 1-A Ex. 43, and Examples related to B group according to the invention are represented by B Ex. 44-B Ex. 77. On the contrary, Comparative Examples related to A group are represented by A Com. Ex. 1-A Com. Ex. 14, and Comparative Examples related to B group are represented by B Com. Ex. 15-B Com. Ex. 26.

Each of the prepared mixtures was charged into a mold and then was pressed at a pressure of 5 ton/cm² to form a tablet, as a molded body, having a diameter of 25 mm and a height of 20 mm. Table 4 shows, as the flowability of each of the mixtures according to the invention, ejection force of the molded body made from the mixture according to the invention, and time from the charging of the mixture of 100 g into a container having an orifis diameter of 5 mm to the discharging thereof. The hopper discharging property was estimated by the number of applied impacts for discharging the whole mixture of 1000 g through an orifis 2.0 mm in diameter disposed at the center of the bottom of a container 100 mm in inner-diameter and 200 mm in height. The green density of the molded body was measured, and then the molded body was sintered at 1130° C. in the atmosphere of RX (end thermic) gas for 20 minutes. Whether or not the sintered body had thereon sooting was observed with inventor's eyes. Result thus obtained are also shown in Table 4. The green density of the molded body was an index of the compressibility of the mixture. Furthermore, the mixture was formed into a molded body having a green density of 6.8 Mg/m³, and then the molded body was sintered under the aforementioned condition. The tensile strength of the sintered body was measured. The bonded degree of carbon C (C-bonded degree) was estimated as an index showing the segregation degree of the graphite powder contained in the mixture. The C-bonded degree is represented by the following equation, using results from sieving of the mixture powder and quantity analysis of carbon. The larger this value is, the less the segregation of the graphite powder in the mixture is caused.

C-bonded degree=(C analyzed value of the iron-based powder having particles which can pass through a 100-mesh (150 μm) sieve but cannot pass through a 200-mesh (75 μm) sieve) /(C analyzed value of the whole of the iron-based powder) ×100(%)

Table 4

As shown in the columns for A Ex. 1 to A Ex. 43 in Table 4, in the case of using the powders and compositions according to the invention, it was possible to obtain iron-based powder mixture for powder metallurgy having excellent flowability of 10.1–11.9 sec./100 g, excellent hopper discharging property of 1–2 times, low ejection force of 115–129 kgf/cm² and C-bonded degree of 80–91%, and causing no bonding of soot to the sintered body, even if zinc stearate or lithium stearate containing a metal was not used as a lubricant.

On the contrary, about the mixtures prepared under the conditions in Comparative Examples various properties of powder characters the molded bodies and the sintered bodies were measured and estimated to show results in Table 7. As evident from Table 7, the mixtures of A Com. Ex. 1, and A Com. Exs. 3 and 4 were low in their flowability and hopper discharging property, since the average molecular weight of the thermoplastic resin powder in the former mixture was over 5000000 and the average agglomeration size of the thermoplastic resin powder in the latter mixtures was less than 5 μm, respectively. The compressibility of the mixture of A Com. Ex. 2, wherein the average primary particle size of the thermoplastic resin powder was over 5 μm, was lower by 0.15 Mg/m³ than that of the mixture of A Ex. 2, wherein the lubricant composition except the resin powder was the same as in A Com. Ex. 2. In the mixture of A Com. Ex. 5 the average agglomeration size of the thermoplastic resin was over 50 μm. As a result, the tensile-strength of the sintered body made from this mixture was low, that is, 360 MPa, as compared with the tensile strength of the sintered bodies from the mixtures of A Exs. 1–43, that is, 410–440 MPa. In the mixture of A Com. Ex. 6, wherein the amount of the incorporated thermoplastic resin powder was small, the flowability and the hopper discharging property were decreased. In the mixture of A Com. Ex. 7, wherein the amount of the incorporated thermoplastic resin was over 0.5% by weight, the compressibility was lower by 0.07 Mg/M³ than the mixture of A Ex. 2, wherein the same lubricants except the thermoplastic resin were incorporated in the same manner as in the A Com. Ex. 7. In the mixture of A Com. Ex. 8, wherein the amount of the heated and mixed lubricants was over 1% by weight, the flowability and the hopper discharging property were inferior. In the mixture of A Com. Ex. 9, wherein the amount of the heated and mixed lubricants was less than 0.1% by weight, the C-bonded degree was low. In the mixture of A Com. Ex. 10, wherein the amount of lubricants except the thermoplastic resin added in the secondary mixing was large, and in the mixtures A Com. Exs. 11 and 12, wherein the amount of the incorporated liquid lubricant as the binder was large, the flowability and the hopper discharging property of them were bad.

In the sintered bodies prepared in both of the aforementioned Examples and Comparative Examples, sooting was not observed. There was no difference in ejection force of the molded body from the mold between Examples and Comparative Examples.

Table 7

B Group

The following were simply mixed with an iron powder (iron-based powder) for powder metallurgy having an average particle size of 78 μm in a V-shaped blender for 15 minutes to obtain each of mixtures in Examples: 1% by weight of a graphite powder (powder for alloy) having an average particle size of 23 μm, 1% by weight of a copper powder (powder for alloy) having an average particle size of 25 μm, and lubricant(s) C and a thermoplastic resin powder shown in Table 8. In the same manner as above, mixtures as Comparative Examples were also prepared by using lubricant (s) C and thermoplastic resins shown in Table 11. These mixtures were estimated in the same manner as the mixtures related to A group. Results thus obtained are shown in Tables 9 and 10.

Table 8

Table 11

As shown in the columns for B Ex. 44 to B Ex. 77 in Table 9, in the invention it was possible to obtain iron-based powder mixtures for powder metallurgy causing no problems about all properties, for example, having excellent flowability of 12.0–12.7 sec./100 g, excellent hopper discharging property of 1 or 0 time and low ejection force power of 121–128 kgf/cm$^2$, and causing good compressibility and tensile strength of the sintered body and no sooting to the sintered body, even if zinc stearate or lithium stearate containing a metal was not used as a lubricant.

Table 9

Table 10

On the contrary, in the B Com. Exs. 13, 14 or 15, wherein stearamide, a melted mixture of stearamide and ethylenebis (stearamide) and ethylenebis(stearamide) was simply mixed as a lubricant, respectively, the flowability and the hopper discharging property were inferior. The compressibility of the mixture of B Com. Ex. 16, wherein the amount of the incorporated thermoplastic resin was over 0.5% by weight, was lower by 0.07 Mg/M$^3$ than that of the mixture of B Ex.52, wherein the same lubricants except the incorporated amount were incorporated. In the mixture of B Com. Ex. 17, wherein the average molecular weight of the thermoplastic resin was over 5000000, and in the mixtures of B Com. Exs. 19 and 20, wherein the average agglomeration size of the thermoplastic resin powders was less than 5 μm, the flowability and the hopper discharging property were low. In the mixture of B Com. Ex. 18, wherein the primary particle size of the thermoplastic resin powder was over 5 μm, the compressibility was lower by 0.15 Mg/m$^3$ than the mixture of B Ex. 49, wherein the same lubricant composition except that was used. In the mixture of B Com. Ex. 21, wherein the average agglomeration size of the thermoplastic resin powder was over 50 μm, its tensile strength was lower, that is, 370 MPa, than the tensile strength of all the mixtures of B Exs. 44–77, that is, 400–440 MPa. In the mixture of B Com. Ex. 22, wherein the total amount of the added lubricants except the thermoplastic resin powder was less than 0.1% by weight and the ejection force was large, and in the mixtures B Com. Ex. 23, wherein the total amount of the added lubricants was over 1% by weight, the flowability and the hopper discharging property were bad.

As described above, the invention makes it possible to provide an iron-based powder mixture for powder metallurgy, comprising a lubricant which does not contain any metal element causing the contamination inside a sintering furnace, keeping the ejection force and the C-bonded degree as high as those of mixtures in the prior art, and exhibiting excellent flowability and hopper discharging property; and a process for preparing this mixture.

TABLE 1

| Sorts | Composition | ratio (% by weight) | Polymerization method |
|---|---|---|---|
| 1 | MMA | 100 | Copolymerization |
| 2 | BA/MMA | 60/40 | Core shell 2-step polymerization |
| 3 | ST/BMA | 70/30 | Copolymerization |
| 4 | MMA/BD | 85/15 | Copolymerization |
| 5 | MMA/BMA | 70/30 | Copolymerization |
| 6 | ST/AN | 80/20 | Copolymerization |
| 7 | EA/ST | 60/40 | Core shell 2-step polymerization |

MMA: Methyl methacrylate
BMA: n-Butyl methacrylate
EA: Ethyl acrylate
BA: n-Butyl acrylate
AN: Acrylonitryl
BD: Butadiene
ST: Styrene

TABLE 2

| | Primary-mixed lubricant (% by weight) | | | | | | | |
|---|---|---|---|---|---|---|---|---|
| | Organic lubricant (A) | | | | | | Liquid lubricant | |
| | Stearic acid | Oleamide | Strearamide | Melt mixture of Strearamide and ethylenebis (stearamide) | Ethylenebis (stearamide) | Total amount of the (A) | Oleic acid | Spindle oil |
| A Ex. 1 | | 0.30 | | | | 0.30 | 0.08 | |
| A Ex. 2 | 0.10 | | 0.25 | | 0.15 | 0.50 | | |
| A Ex. 3 | | | | | 0.50 | 0.50 | | |
| A Ex. 4 | | | | 0.20 | 0.20 | 0.40 | | |
| A Ex. 5 | | | 0.20 | 0.20 | | 0.40 | | |
| A Ex. 6 | | | | 0.20 | 0.15 | 0.35 | | 0.04 |
| A Ex. 7 | 0.20 | 0.20 | | | | 0.40 | | |
| A Ex. 8 | | | 0.10 | | 0.10 | 0.20 | | |
| A Ex. 9 | 0.20 | | 0.20 | 0.20 | 0.20 | 0.80 | | |
| A Ex. 10 | | 0.20 | | 0.20 | | 0.40 | | |
| A Ex. 11 | 0.10 | | | | 0.30 | 0.40 | | |
| A Ex. 12 | | | 0.20 | 0.60 | | 0.80 | | |
| A Ex. 13 | | 0.20 | | | 0.30 | 0.50 | | |
| A Ex. 14 | | 0.30 | | | | 0.30 | 0.08 | |
| A Ex. 15 | 0.10 | | 0.25 | | 0.15 | 0.50 | | |
| A Ex. 16 | | | | | 0.50 | 0.50 | | |
| A Ex. 17 | | | 0.30 | | 0.30 | 0.60 | | |
| A Ex. 18 | | | 0.20 | 0.20 | | 0.40 | | |
| A Ex. 19 | | | | 0.20 | 0.15 | 0.35 | | 0.04 |
| A Ex. 20 | 0.20 | 0.20 | | | | 0.40 | | |

TABLE 2-continued

| | Primary-mixed lubricant (% by weight) | | | | | | | |
|---|---|---|---|---|---|---|---|---|
| | Organic lubricant (A) | | | | | | Liquid lubricant | |
| | Stearic acid | Oleamide | Strearamide | Melt mixture of Strearamide and ethylenebis (stearamide) | Ethylenebis (stearamide) | Total amount of the (A) | Oleic acid | Spindle oil |
| A Ex. 21 | | | 0.10 | | 0.10 | 0.20 | | |
| A Ex. 22 | 0.20 | | 0.20 | 0.20 | 0.20 | 0.80 | | |
| A Ex. 23 | | 0.20 | | 0.20 | | 0.40 | | |
| A Ex. 24 | 0.10 | | | | 0.30 | 0.40 | | |
| A Ex. 25 | | | 0.20 | 0.60 | | 0.80 | | |
| A Ex. 26 | | 0.20 | | | 0.30 | 0.50 | | |
| A Ex. 27 | 0.20 | | 0.20 | 0.20 | 0.20 | 0.80 | | |
| A Ex. 28 | | 0.20 | | 0.20 | | 0.40 | | |
| A Ex. 29 | 0.10 | | | | 0.30 | 0.40 | | |
| A Ex. 30 | | 0.30 | | | | 0.30 | 0.08 | |
| A Ex. 31 | 0.10 | | 0.25 | | 0.15 | 0.50 | | |
| A Ex. 32 | | | | | 0.50 | 0.50 | | |
| A Ex. 33 | | | 0.30 | | 0.30 | 0.60 | | |
| A Ex. 34 | | | 0.20 | 0.20 | | 0.40 | | |
| A Ex. 35 | | | | 0.20 | 0.15 | 0.35 | | 0.04 |
| A Ex. 36 | 0.20 | 0.20 | | | | 0.40 | | |
| A Ex. 37 | | | 0.10 | | 0.10 | 0.20 | | |
| A Ex. 38 | 0.20 | | 0.20 | 0.20 | 0.20 | 0.80 | | |
| A Ex. 39 | | 0.20 | | 0.20 | | 0.40 | | |
| A Ex. 40 | 0.10 | | | | 0.30 | 0.40 | | |
| A Ex. 41 | | | 0.20 | 0.60 | | 0.80 | | |
| A Ex. 42 | | 0.20 | | | 0.30 | 0.50 | | |
| A Ex. 43 | 0.20 | | 0.20 | 0.20 | 0.20 | 0.80 | | |

TABLE 3

| | Secondary-mixed lubricant (% by weight) | | | | | | | | | Thermoplastic resin powder | | | |
|---|---|---|---|---|---|---|---|---|---|---|---|---|---|
| | Lubricant (B) (% by weight) | | | | | | | | | | | | |
| | Stearic acid | Oleamide | Stearamide | Melt mixture of stearamide and ethylenebis(stearamide) | Ethylenebis (stearamide) | Polyethylene Molecular (weight: 3000) | Melt mixture of polyethylene and ethylenebis (stearamide) | Total amount of the (B) (% by weight) | % by weight | Sort | Average molecular weight (ten-thousand) | Primary particle size (μm) | Average agglomerated particle size (μm) |
| A Ex. 1 | 0.10 | 0.10 | | | 0.10 | | | 0.30 | 0.30 | 1 | 300 | 2 | 20 |
| A Ex. 2 | | | 0.15 | 0.15 | | | | 0.30 | 0.20 | 1 | 20 | 0.50 | 30 |
| A Ex. 3 | | | | 0.20 | | | | 0.20 | 0.15 | 1 | 30 | 1 | 40 |
| A Ex. 4 | | | | | | | 0.20 | 0.20 | 0.15 | 1 | 100 | 0.20 | 45 |
| A Ex. 5 | | | | 0.20 | | | | 0.20 | 0.20 | 1 | 400 | 4 | 30 |
| A Ex. 6 | | | 0.10 | 0.05 | | | | 0.15 | 0.40 | 1 | 10 | 3 | 30 |
| A Ex. 7 | | | | | | | | 0.00 | 0.30 | 1 | 5 | 1 | 35 |
| A Ex. 8 | | 0.10 | | | 0.10 | | | 0.20 | 0.40 | 1 | 30 | 5 | 20 |
| A Ex. 9 | 0.10 | | 0.10 | | | | | 0.20 | 0.15 | 1 | 40 | 1 | 30 |
| A Ex. 10 | | | 0.10 | | | | | 0.10 | 0.30 | 1 | 30 | 0.1 | 30 |
| A Ex. 11 | | | | 0.15 | | | | 0.15 | 0.10 | 1 | 100 | 1 | 45 |
| A Ex. 12 | 0.10 | | 0.10 | | 0.10 | | | 0.30 | 0.20 | 1 | 20 | 2 | 30 |
| A Ex. 13 | | | 0.10 | 0.05 | | | | 0.15 | 0.15 | 1 | 40 | 0.08 | 30 |
| A Ex. 14 | 0.10 | 0.10 | | | 0.10 | | | 0.30 | 0.30 | 2 | 300 | 1.50 | 30 |
| A Ex. 15 | | | 0.15 | 0.15 | | | | 0.30 | 0.20 | 2 | 20 | 0.40 | 40 |
| A Ex. 16 | | | | 0.20 | | | | 0.20 | 0.15 | 2 | 30 | 2 | 45 |
| A Ex. 17 | | | | | | | | 0.00 | 0.15 | 2 | 100 | 1 | 30 |
| A Ex. 18 | | | | 0.20 | | | | 0.20 | 0.20 | 2 | 400 | 0.03 | 30 |
| A Ex. 19 | | | 0.10 | 0.05 | | | | 0.15 | 0.40 | 3 | 10 | 4 | 35 |
| A Ex. 20 | | | | | | | | 0.00 | 0.30 | 3 | 5 | 2 | 20 |
| A Ex. 21 | | 0.10 | | | 0.10 | | | 0.20 | 0.40 | 3 | 30 | 0.08 | 45 |

TABLE 3-continued

Secondary-mixed lubricant (% by weight)

| | Lubricant (B) (% by weight) | | | | | | Total amount of the (B) (% by weight) | Thermoplastic resin powder | | | | |
|---|---|---|---|---|---|---|---|---|---|---|---|---|
| | Stearic acid | Ole-amide | Steara-mide | Melt mixture of stearamide and ethylene-bis(stear-amide) | Ethyle-nebis (stear-amide) | Poly-ethylene Molecu-lar (weight: 3000) | Melt mixture of polyethylene and ethylenebis (stearamide) | | % by weight | Sort | Average molecular weight (ten-thousand) | Primary particle size (μm) | Average agglomerated particle size (μm) |
| A Ex. 22 | 0.10 | | 0.10 | | | | | 0.20 | 0.15 | 3 | 40 | 3 | 15 |
| A Ex. 23 | | | 0.10 | | | | | 0.10 | 0.30 | 3 | 30 | 0.30 | 30 |
| A Ex. 24 | | | | 0.15 | | | | 0.15 | 0.10 | 4 | 100 | 1 | 40 |
| A Ex. 25 | 0.10 | | 0.10 | | 0.10 | | | 0.30 | 0.20 | 4 | 20 | 3 | 30 |
| A Ex. 26 | | | 0.10 | | 0.05 | | | 0.15 | 0.15 | 4 | 40 | 0.08 | 45 |
| A Ex. 27 | | | | | | 0.20 | | 0.20 | 0.20 | 4 | 40 | 0.10 | 20 |
| A Ex. 28 | | | | | | | 0.20 | 0.20 | 0.25 | 4 | 100 | 2 | 30 |
| A Ex. 29 | | | | | 0.10 | | 0.10 | 0.20 | 0.15 | 5 | 25 | 0.40 | 40 |
| A Ex. 30 | 0.10 | 0.10 | | | 0.10 | | | 0.30 | 0.30 | 5 | 300 | 2 | 45 |
| A Ex. 31 | | | 0.15 | 0.15 | | | | 0.30 | 0.20 | 5 | 20 | 0.40 | 30 |
| A Ex. 32 | | | 0.20 | | | | | 0.20 | 0.15 | 5 | 30 | 2 | 30 |
| A Ex. 33 | | | | | | | | 0.00 | 0.15 | 5 | 100 | 3 | 45 |
| A Ex. 34 | | | 0.20 | | | | | 0.20 | 0.20 | 6 | 400 | 0.09 | 30 |
| A Ex. 35 | | | 0.10 | 0.05 | | | | 0.15 | 0.40 | 6 | 10 | 3 | 35 |
| A Ex. 36 | | | | | | | | 0.00 | 0.30 | 6 | 5 | 1 | 30 |
| A Ex. 37 | | 0.10 | | | 0.10 | | | 0.20 | 0.40 | 6 | 30 | 4 | 40 |
| A Ex. 38 | 0.10 | | 0.10 | | | | | 0.20 | 0.15 | 6 | 40 | 0.30 | 45 |
| A Ex. 39 | | | 0.10 | | | | | 0.10 | 0.30 | 7 | 30 | 0.10 | 10 |
| A Ex. 40 | | | | 0.15 | | | | 0.15 | 0.10 | 7 | 100 | 2 | 30 |
| A Ex. 41 | 0.10 | | 0.10 | | 0.10 | | | 0.30 | 0.20 | 7 | 20 | 4 | 45 |
| A Ex. 42 | | | 0.10 | | 0.05 | | | 0.15 | 0.15 | 7 | 40 | 1 | 30 |
| A Ex. 43 | | | | | | 0.20 | | 0.20 | 0.20 | 7 | 40 | 0.10 | 30 |

TABLE 4

| | Flowability (sec/100 g) | Hopper discharging property time | Ejection force Kgf/cm² | C-bonded degree % | Soot on the sintered body Outbreak |
|---|---|---|---|---|---|
| A Ex. 1 | 10.8 | 1 | 120 | 90 | None |
| A Ex. 2 | 10.6 | 1 | 125 | 83 | None |
| A Ex. 3 | 10.5 | 1 | 122 | 85 | None |
| A Ex. 4 | 10.1 | 1 | 124 | 84 | None |
| A Ex. 5 | 11.2 | 1 | 125 | 84 | None |
| A Ex. 6 | 11.0 | 1 | 118 | 91 | None |
| A Ex. 7 | 11.0 | 1 | 122 | 80 | None |
| A Ex. 8 | 10.9 | 1 | 125 | 83 | None |
| A Ex. 9 | 10.6 | 2 | 128 | 81 | None |
| A Ex. 10 | 11.2 | 1 | 118 | 80 | None |
| A Ex. 11 | 11.7 | 1 | 115 | 85 | None |
| A Ex. 12 | 11.3 | 1 | 120 | 86 | None |
| A Ex. 13 | 11.5 | 1 | 121 | 82 | None |
| A Ex. 14 | 10.6 | 2 | 121 | 85 | None |
| A Ex. 15 | 10.9 | 1 | 123 | 84 | None |
| A Ex. 16 | 11.0 | 2 | 124 | 84 | None |
| A Ex. 17 | 10.5 | 1 | 122 | 81 | None |
| A Ex. 18 | 11.4 | 1 | 123 | 80 | None |
| A Ex. 19 | 10.5 | 2 | 119 | 83 | None |
| A Ex. 20 | 11.4 | 1 | 126 | 81 | None |
| A Ex. 21 | 10.8 | 1 | 123 | 80 | None |
| A Ex. 22 | 11.2 | 2 | 122 | 85 | None |
| A Ex. 23 | 11.5 | 1 | 124 | 86 | None |
| A Ex. 24 | 11.6 | 2 | 117 | 82 | None |
| A Ex. 25 | 11.0 | 1 | 126 | 83 | None |
| A Ex. 26 | 10.9 | 1 | 123 | 80 | None |
| A Ex. 27 | 11.5 | 2 | 125 | 84 | None |
| A Ex. 28 | 10.6 | 1 | 124 | 82 | None |
| A Ex. 29 | 11.0 | 1 | 123 | 86 | None |
| A Ex. 30 | 11.6 | 2 | 127 | 81 | None |
| A Ex. 31 | 10.3 | 1 | 124 | 84 | None |
| A Ex. 32 | 10.8 | 1 | 125 | 81 | None |
| A Ex. 33 | 11.3 | 2 | 127 | 83 | None |
| A Ex. 34 | 11.5 | 1 | 120 | 85 | None |
| A Ex. 35 | 11.4 | 1 | 129 | 80 | None |
| A Ex. 36 | 11.6 | 2 | 120 | 82 | None |
| A Ex. 37 | 10.7 | 1 | 121 | 86 | None |
| A Ex. 38 | 10.7 | 2 | 119 | 83 | None |
| A Ex. 39 | 11.5 | 1 | 120 | 85 | None |
| A Ex. 40 | 11.3 | 1 | 124 | 81 | None |
| A Ex. 41 | 10.5 | 2 | 123 | 83 | None |
| A Ex. 42 | 11.9 | 1 | 124 | 80 | None |
| A Ex. 43 | 11.3 | 2 | 124 | 81 | None |

TABLE 5

Primary mixed lubricant (% by weight)

| | Organic lubricant (A) | | | | | Total amount of the (B) (% by weight) | Liquid lubricant | |
|---|---|---|---|---|---|---|---|---|
| | Stearic acid | Oleamide | Strearamide | Melt mixture of stearamide and ethylene-bis(stearamide) | Ethylene-bis(stearamide) | | Oleamide | Spindle oil |
| A Com. Ex. 1 | | 0.30 | | | | 0.30 | 0.08 | |
| A Com. Ex. 2 | 0.10 | | 0.25 | | 0.15 | 0.50 | | |
| A Com. Ex. 3 | 0.15 | | 0.20 | | | 0.35 | | |
| A Com. Ex. 4 | | 0.35 | | 0.25 | | 0.60 | | |
| A Com. Ex. 5 | | | 0.15 | | 0.20 | 0.35 | | |
| A Com. Ex. 6 | 0.10 | | 0.25 | | 0.15 | 0.50 | | |
| A Com. Ex. 7 | 0.10 | | 0.25 | | 0.15 | 0.50 | | |
| A Com. Ex. 8 | | | 0.60 | 0.70 | | 1.30 | | |
| A Com. Ex. 9 | | | | 0.05 | | 0.05 | | |
| A Com. Ex. 10 | | 0.15 | | | | 0.15 | | |
| A Com. Ex. 11 | 0.20 | | 0.20 | 0.20 | 0.20 | 0.80 | 0.40 | |
| A Com. Ex. 12 | | 0.20 | 0.20 | | | 0.40 | | 0.40 |

TABLE 6

Secondary-mixed lubricant (% by weight)

| | Lubricant (B) (% by weight) | | | | | | | Total amount of the (B) (% by weight) | Thermoplastic resin powder | | | | |
|---|---|---|---|---|---|---|---|---|---|---|---|---|---|
| | Stearic acid | Ole-amide | Steara-mide | Melt mixture of stearamide and ethylene-bis(stear-amide) | Ethyle-nebis (stear-amide) | Poly-ethylene Molecu-lar (weight: 3000) | Melt mixture of polyethylene and ethylenebis (stearamide) | | % by weight | Sort | Average molecular weight (ten-thousand) | Primary particle size (μm) | Average agglomerated particle size (μm) |
| A Com. Ex. 1 | 0.10 | 0.10 | | | 0.10 | | | 0.30 | 0.30 | 1 | 700 | 3 | 30 |
| A Com. Ex. 2 | | | 0.15 | 0.15 | | | | 0.30 | 0.20 | 1 | 30 | 50 | 50 |
| A Com. Ex. 3 | | | 0.20 | | | | | 0.20 | 0.40 | 1 | 40 | 1 | 2 |
| A Com. Ex. 4 | | 0.20 | | | | | | 0.20 | 0.30 | 1 | 50 | 1 | 4 |
| A Com. Ex. 5 | 0.20 | | | | | | | 0.20 | 0.25 | 1 | 100 | 3 | 150 |
| A Com. Ex. 6 | | | 0.20 | 0.20 | | | | 0.40 | 0.00 | 1 | | | |
| A Com. Ex. 7 | | | 0.15 | 0.15 | | | | 0.30 | 0.70 | 1 | 30 | 1 | 30 |
| A Com. Ex. 8 | | | 0.20 | | | | | 0.20 | 0.20 | 1 | 40 | 3 | 25 |
| A Com. Ex. 9 | | | | 0.15 | 0.20 | | | 0.35 | 0.20 | 1 | 30 | 1 | 30 |
| A Com. Ex. 10 | 0.50 | | | 0.70 | | | | 1.20 | 0.20 | 1 | 30 | 5 | 20 |
| A Com. Ex. 11 | 0.10 | 0.10 | | | | | | 0.20 | 0.15 | 1 | 40 | 1 | 30 |
| A Com. Ex. 12 | | | 0.10 | | | | | 0.10 | 0.30 | 1 | 30 | 3 | 30 |

TABLE 7

| | Flowability (sec/100 g) | Hopper discharging property time | Ejection force Kgf/cm² | C-bonded degree % | Soot on the sintered body Outbreak |
|---|---|---|---|---|---|
| A Com. Ex. 1 | 14.3 | 22 | 125 | 81 | None |
| A Com. Ex. 2 | 11.5 | 2 | 120 | 80 | None |

TABLE 7-continued

| | Flowability (sec/100 g) | Hopper discharging property time | Ejection force Kgf/cm² | C-bonded degree % | Soot on the sintered body Outbreak |
|---|---|---|---|---|---|
| A Com. Ex. 3 | 13.9 | 15 | 115 | 81 | None |
| A Com. Ex. 4 | 13.7 | 11 | 123 | 80 | None |
| A Com. Ex. 5 | 10.9 | 1 | 120 | 84 | None |
| A Com. Ex. 6 | 14.0 | 17 | 120 | 82 | None |
| A Com. Ex. 7 | 11.2 | 1 | 125 | 80 | None |
| A Com. Ex. 8 | 14.1 | 8 | 123 | 84 | None |
| A Com. Ex. 9 | 10.8 | 1 | 135 | 45 | None |
| A Com. Ex. 10 | 14.2 | 17 | 123 | 86 | None |
| A Com. Ex. 11 | 15.2 | 15 | 128 | 94 | None |
| A Com. Ex. 12 | 14.8 | 21 | 118 | 94 | None |

TABLE 8

| | Lubricant (B) (% by weight) | | | | | | Total amount of the (C) (% by weight) | Thermoplastic resin powder | | | | |
|---|---|---|---|---|---|---|---|---|---|---|---|---|
| | Stearic acid | Oleamide | Stream­amide | Melt-mixture of stearamide and ethylenebis (stearamide) | Ethyle­nebis (steara­mide) | Polyethy­lene (Molec­ular weight: 3000) | Melt mixture of polyethy­lene and ethylene­bis(stea­ramide) | | % by weight | Sort | Average molecu­lar weight (ten-thousand) | Primary particle size (μm) | Average agglom­erated particle (μm) |
| B Ex. 44 | | | 0.50 | | | | | 0.50 | 0.30 | 1 | 30 | 0.50 | 30 |
| B Ex. 45 | | | | 0.40 | 0.40 | | | 0.80 | 0.20 | 1 | 300 | 4 | 25 |
| B Ex. 46 | 0.40 | | 0.35 | | | | | 0.75 | 0.15 | 1 | 5 | 1 | 30 |
| B Ex. 47 | | | | 0.30 | 0.20 | | | 0.50 | 0.45 | 1 | 25 | 1 | 10 |
| B Ex. 48 | | | 0.25 | 0.20 | | | | 0.45 | 0.40 | 1 | 40 | 4 | 6 |
| B Ex. 49 | 0.10 | | 0.20 | | 0.15 | | | 0.45 | 0.30 | 1 | 30 | 2 | 45 |
| B Ex. 50 | | | 0.20 | 0.20 | 0.20 | | | 0.60 | 0.10 | 1 | 30 | 0.10 | 30 |
| B Ex. 51 | | 0.50 | | 0.20 | 0.10 | | | 0.80 | 0.25 | 1 | 25 | 1 | 25 |
| B Ex. 52 | | 0.25 | 0.25 | | | | | 0.50 | 0.30 | 1 | 25 | 0.08 | 20 |
| B Ex. 53 | | | | 0.50 | 0.10 | | | 0.60 | 0.40 | 1 | 30 | 1 | 40 |
| B Ex. 54 | | | 0.50 | | | | | 0.50 | 0.30 | 2 | 30 | 0.70 | 30 |
| B Ex. 55 | | | | 0.40 | 0.40 | | | 0.80 | 0.20 | 2 | 300 | 4 | 25 |
| B Ex. 56 | 0.40 | | 0.35 | | | | | 0.75 | 0.15 | 2 | 5 | 2 | 30 |
| B Ex. 57 | | | | 0.30 | 0.20 | | | 0.50 | 0.15 | 2 | 25 | 2 | 10 |
| B Ex. 58 | | | 0.25 | 0.20 | | | | 0.45 | 0.20 | 3 | 40 | 0.80 | 6 |
| B Ex. 59 | 0.10 | | 0.20 | | 0.15 | | | 0.45 | 0.40 | 3 | 30 | 2 | 45 |
| B Ex. 60 | | | 0.20 | 0.20 | 0.20 | | | 0.60 | 0.30 | 3 | 30 | 0.10 | 30 |
| B Ex. 61 | | 0.50 | | 0.20 | 0.10 | | | 0.80 | 0.40 | 3 | 25 | 1 | 25 |
| B Ex. 62 | | 0.25 | 0.25 | | | | | 0.50 | 0.15 | 4 | 25 | 0.08 | 20 |
| B Ex. 63 | | | | 0.50 | 0.10 | | | 0.60 | 0.30 | 4 | 30 | 1 | 40 |
| B Ex. 64 | | | | | | 0.30 | | 0.30 | 0.10 | 4 | 40 | 0.08 | 30 |
| B Ex. 65 | | | | | | | 0.40 | 0.40 | 0.20 | 4 | 60 | 0.05 | 45 |
| B Ex. 66 | | | 0.50 | | | | | 0.50 | 0.15 | 5 | 30 | 0.50 | 30 |
| B Ex. 67 | | | | 0.40 | 0.40 | | | 0.80 | 0.20 | 5 | 300 | 4 | 10 |
| B Ex. 65 | 0.40 | | 0.35 | | | | | 0.75 | 0.25 | 5 | 5 | 1 | 6 |
| B Ex. 69 | | | | 0.30 | 0.20 | | | 0.50 | 0.15 | 5 | 25 | 1 | 45 |
| B Ex. 70 | | | 0.25 | 0.20 | | | | 0.45 | 0.30 | 6 | 40 | 4 | 30 |
| B Ex. 71 | 0.10 | | 0.20 | | 0.15 | | | 0.45 | 0.20 | 6 | 30 | 2 | 25 |
| B Ex. 72 | | | 0.20 | 0.20 | 0.20 | | | 0.60 | 0.15 | 6 | 30 | 0.10 | 30 |
| B Ex. 73 | | 0.50 | | 0.20 | 0.10 | | | 0.80 | 0.15 | 6 | 25 | 1 | 10 |
| B Ex. 74 | | 0.25 | 0.25 | | | | | 0.50 | 0.20 | 7 | 15 | 0.08 | 6 |
| B Ex. 75 | | | | 0.50 | 0.10 | | | 0.60 | 0.40 | 7 | 30 | 1 | 45 |
| B Ex. 76 | | | | | | 0.30 | | 0.30 | 0.30 | 7 | 40 | 0.08 | 30 |
| B Ex. 77 | | | | | | | 0.40 | 0.40 | 0.40 | 7 | 60 | 0.05 | 25 |

TABLE 9

| | Flowability (sec/100 g) | Hopper discharging property time | Ejection force Kgf/cm$^2$ | Soot on the sintered body Outbreak |
|---|---|---|---|---|
| B Ex. 44 | 12.2 | 0 | 122 | None |
| B Ex. 45 | 12.1 | 0 | 123 | None |
| B Ex. 46 | 12.5 | 0 | 121 | None |
| B Ex. 47 | 12.4 | 1 | 126 | None |
| B Ex. 48 | 12.2 | 0 | 125 | None |
| B Ex. 49 | 12.3 | 1 | 116 | None |
| B Ex. 50 | 12.1 | 0 | 118 | None |
| B Ex. 51 | 12.2 | 1 | 123 | None |
| B Ex. 52 | 12.4 | 0 | 128 | None |
| B Ex. 53 | 12.0 | 0 | 122 | None |
| B Ex. 54 | 12.4 | 0 | 125 | None |
| B Ex. 55 | 12.2 | 0 | 116 | None |
| B Ex. 56 | 12.3 | 0 | 118 | None |
| B Ex. 57 | 12.1 | 1 | 123 | None |
| B Ex. 58 | 12.2 | 0 | 128 | None |
| B Ex. 59 | 12.4 | 1 | 122 | None |
| B Ex. 60 | 12.0 | 0 | 123 | None |
| B Ex. 61 | 12.5 | 1 | 120 | None |
| B Ex. 62 | 12.6 | 0 | 125 | None |
| B Ex. 63 | 12.0 | 0 | 123 | None |
| B Ex. 64 | 12.2 | 0 | 124 | None |
| B Ex. 65 | 12.4 | 1 | 121 | None |
| B Ex. 66 | 12.5 | 0 | 122 | None |
| B Ex. 67 | 12.3 | 0 | 126 | None |
| B Ex. 68 | 12.7 | 0 | 120 | None |
| B Ex. 69 | 12.5 | 1 | 127 | None |
| B Ex. 70 | 12.0 | 0 | 124 | None |
| B Ex. 71 | 12.6 | 1 | 129 | None |
| B Ex. 72 | 12.6 | 0 | 110 | None |
| B Ex. 73 | 12.3 | 1 | 123 | None |
| B Ex. 74 | 12.0 | 0 | 123 | None |
| B Ex. 75 | 12.0 | 1 | 120 | None |
| B Ex. 76 | 12.2 | 1 | 112 | None |
| B Ex. 77 | 12.6 | 1 | 125 | None |

TABLE 10

| | Flowability (sec/100 g) | Hopper discharging property time | Ejection force Kgf/cm$^2$ | Soot on the sintered body Outbreak |
|---|---|---|---|---|
| B Com. Ex. 13 | 15.2 | 25 | 120 | None |
| B Com. Ex. 14 | 15.0 | 19 | 119 | None |
| B Com. Ex. 15 | 14.8 | 16 | 125 | None |
| B Com. Ex. 16 | 12.2 | 0 | 128 | None |
| B Com. Ex. 17 | 13.5 | 12 | 120 | None |
| B Com. Ex. 18 | 12.5 | 2 | 124 | None |
| B Com. Ex. 19 | 14.5 | 13 | 120 | None |
| B Com. Ex. 20 | 14.2 | 15 | 123 | None |
| B Com. Ex. 21 | 12.5 | 1 | 125 | None |
| B Com. Ex. 22 | 12.8 | 1 | 175 | None |
| B Com. Ex. 23 | 14.5 | 12 | 118 | None |

TABLE 11

| | Lubricant (C) | | | | | | Polymethyl methacrylate (Sort 1) | | |
|---|---|---|---|---|---|---|---|---|---|
| | | | Melt mixture of stearamide and | | | | | | |
| | Stearic acid % by weight | Oleamide % by weight | Stearamide % by weight | ethylenebis (stearamide) % by weight | Ethylenebis(stearamide) % by weight | Total amount of the (C) % by weight | % by weight | Average molecular weight (ten-thousand) | Primary particle size (μm) | Average agglomerated particle size (μm) |
| B Com. Ex. 13 | | | | | 0.80 | 0.80 | 0.00 | | | |
| B Com. Ex. 14 | | | | 0.80 | | 0.80 | 0.00 | | | |
| B Com. Ex. 15 | | | 0.80 | | | 0.80 | 0.00 | | | |
| B Com. Ex. 16 | | 0.25 | 0.25 | | | 0.50 | 0.80 | 25 | 2 | 20 |
| B Com. Ex. 17 | | | | 0.25 | 0.25 | 0.50 | 0.30 | 700 | 3 | 30 |
| B Com. Ex. 18 | 0.10 | | 0.20 | | 0.15 | 0.45 | 0.30 | 30 | 50 | 50 |
| B Com. Ex. 19 | | | 0.30 | | 0.25 | 0.55 | 0.30 | 40 | 0.2 | 2 |
| B Com. Ex. 20 | 0.10 | | 0.20 | | 0.15 | 0.45 | 0.30 | 50 | 1 | 4 |
| B Com. Ex. 21 | 0.10 | | 0.20 | | 0.15 | 0.45 | 0.30 | 100 | 3 | 150 |
| B Com. Ex. 22 | | | | | 0.05 | 0.05 | 0.30 | 100 | 3 | 25 |
| B Com. Ex. 23 | | | 0.60 | | 0.50 | 1.10 | 0.30 | 30 | 3 | 25 |

What is claimed is:

1. An iron-based powder mixture for powder metallurgy, comprising:

an iron-based powder, and from 0.05 to 0.50% by weight of a thermoplastic resin powder which comprises 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000.

2. An iron-based powder mixture for powder metallurgy, comprising:

an iron-based powder, from 0.1 to 1.0% by weight of at least one lubricant bonded to the iron-based powder, and selected from the group consisting of stearic acid, oleamide, stearamide, a melted mixture of stearamide and ethylenebis(stearamide), and ethylenebis(stearamide), a powder for alloy and/or a powder for improving cutting property, bonded to the iron-based powder with the lubricant, and from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000.

3. An iron-based powder mixture for powder metallurgy according to claim 2, which further comprises 0.5% or less by weight of at least one lubricant powder selected from the group consisting of stearic acid, oleamide, stearamide, a melted mixture of stearamide and ethylenebis(stearamide), ethylenebis(stearamide), polyethylene having a molecular weight of 10000 or less, and a melted mixture of ethylenebis(stearamide) and polyethylene having a molecular weight of 10000 or less.

4. An iron-based powder mixture for powder metallurgy according to claim 2, which further comprises from 0.01 to 0.3% by weight of at least one organic liquid lubricant selected from the group consisting of oleic acid, spindle oil and turbine oil.

5. An iron-based powder mixture for powder metallurgy, comprising:

an iron-based powder, a powder for alloy and/or a powder for improving cutting property, from 0.1 to 1.0% by weight of at least one lubricant powder selected from the group consisting of stearic acid, oleamide, stearamide, a melted mixture of stearamide and ethylenebis(stearamide), ethylenebis(stearamide), polyethylene having a molecular weight of 10000 or less, and a melted mixture of ethylenebis(stearamide) and polyethylene having a molecular weight of 10000 or less, from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000.

6. An iron-based powder mixture for powder metallurgy according to claim 1, wherein the thermoplastic resin powder is poly(methylmethacrylate).

7. A process for preparing an iron-based powder mixture for powder metallurgy, comprising the steps of:

mixing an iron-based powder, a powder for alloy and/or a powder for improving cutting property, and from 0.1 to 1.0% by weight of at least one lubricant selected from the group consisting of stearic acid, oleamide, stearamide, a melted mixture of stearamide and ethylenebis(stearamide), and ethylenebis(stearamide), heating and mixing the mixture, in the case wherein the lubricant of a single sort is used, at not less than 10—not less than 100° C. temperature than the melting point of the lubricant, and, in the case wherein the lubricants of 2 or more sorts are used, at a temperature within the range from not less than 10° C. higher temperature than the lowest melting point of the lubricants to the highest melting point of the lubricants, cooling the mixture, thereby bonding the powder for alloy and/or the powder for improving cutting property to the iron-based powder with the lubricant, and mixing the mixture after the bonding treatment with from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000.

8. A process for preparing an iron-based powder mixture for powder metallurgy, comprising the steps of:

mixing an iron-based powder, a powder for alloy and/or a powder for improving cutting property, from 0.1 to 1.0% by weight of at least one lubricant selected from the group consisting of stearic acid, oleamide, stearamide, a melted mixture of stearamide and ethylenebis(stearamide), and ethylenebis(stearamide), and from 0.01 to 0.3% by weight of at least one organic liquid lubricant selected from the group consisting of oleic acid, spindle oil and turbine oil, heating and mixing the mixture, in the case wherein the lubricant of a single sort is used, at not less than 10—not less than 100° higher temperature than the melting point of the lubricant, and, in the case wherein the lubricants of 2 or more sorts are used, at a temperature of from not less than 10° C. higher temperature than the lowest melting point of the lubricants to the highest melting point of the lubricants, cooling the mixture, thereby bonding the powder for alloy and/or the powder for improving cutting property to the iron-based powder with the lubricant, and mixing the mixture after the bonding treatment with from 0.05 to 0.50% by weight of a thermoplastic resin powder which contains 50% or more by weight of units of at least one monomer selected from the group consisting of acrylic esters, methacrylic esters, and aromatic vinyl compounds, and whose average primary particle size is from 0.03 to 5 μm, whose average agglomeration particle size is from 5 to 50 μm, and whose average molecular weight measured by the specific viscosity of a solution is from 30000 to 5000000.

9. A process for preparing an iron-based powder mixture for powder metallurgy according to claim 7, wherein from 0.5% or less of at least one selected from the group of the following lubricant powders is added to the mixture after the bonding treatment: stearic acid, oleamide, stearamide, a melted mixture of stearamide and ethylenebis(stearamide), ethylenebis(stearamide), polyethylene having a molecular weight of 10000 or less, and a melted mixture of ethylenebis (stearamide) and polyethylene having a molecular weight of 10000 or less.

10. A process for preparing an iron-based powder mixture for powder metallurgy according to claim 7, wherein the thermoplastic powder is poly(methylmethacrylate).

* * * * *